(12) United States Patent
Angell et al.

(10) Patent No.: US 7,919,326 B2
(45) Date of Patent: Apr. 5, 2011

(54) TRACKING A STATUS OF A CATALYST-DRIVEN PROCESS USING RFIDS

(75) Inventors: Robert L. Angell, Salt Lake City, UT (US); James R. Kraemer, Santa Fe, NM (US)

(73) Assignee: International Business Machines Corporation, Armonk, NY (US)

(*) Notice: Subject to any disclaimer, the term of this patent is extended or adjusted under 35 U.S.C. 154(b) by 426 days.

(21) Appl. No.: 12/049,084

(22) Filed: Mar. 14, 2008

(65) Prior Publication Data

US 2009/0231127 A1    Sep. 17, 2009

(51) Int. Cl.
*G01B 1/08* (2006.01)
*G01B 1/00* (2006.01)

(52) U.S. Cl. .............. 436/56; 340/539.22; 340/539.1; 340/531; 340/500

(58) Field of Classification Search .............. 436/56; 340/539.22, 539.1, 531, 530
See application file for complete search history.

(56) References Cited

U.S. PATENT DOCUMENTS

| 6,867,983 B2* | 3/2005 | Liu et al. ............ 361/761 |
| 2004/0026754 A1* | 2/2004 | Liu et al. ............ 257/414 |

FOREIGN PATENT DOCUMENTS

WO    WO 2006/026748    *    3/2006

* cited by examiner

*Primary Examiner* — Walter D Griffin
*Assistant Examiner* — Christine T Mui
(74) *Attorney, Agent, or Firm* — Dillon & Yudell LLP (57) ABSTRACT

A method of tracking a status of a catalytic process in a mixture incorporates the use of Radio Frequency Identification (RFID) tags that have corrosive-sensitive coatings. The coatings are removable, by a corrosive in the mixture, at a rate that tracks with the rate at which a catalytic-driven process progresses. As coatings on the RFID tags are removed by the corrosive in the mixture, the digital signatures returned by the RFID tags change, in response to the corrosive damaging the RFID tags. By quantifying the number of damaged RFID tags, a determination can be made as to the progress status of the catalytic process.

20 Claims, 6 Drawing Sheets

TRACKING A STATUS OF A CATALYST-DRIVEN PROCESS USING RFIDS

BACKGROUND OF THE INVENTION

1. Technical Field

The present disclosure relates to the field of chemical processing, and specifically to catalyst-driven processes. Still more particularly, the present disclosure relates to electronically tracking a catalyst-driven process.

2. Description of the Related Art

Chemical processes are often driven by catalysts. A catalyst is a material that promotes a chemical reaction, transformation or other physical event to occur between two or more reactants. A catalyst may be one of the reactants, or more typically, is a different chemical or compound than the reactants.

SUMMARY OF THE INVENTION

A method of tracking a status of a catalytic process in a mixture incorporates the use of Radio Frequency Identification (RFID) tags that have corrosive-sensitive coatings. The coatings are removable, by a corrosive in the mixture, at a rate that tracks with the rate at which a catalytic-driven process progresses. As coatings on the RFID tags are removed by the corrosive in the mixture, the digital signatures returned by the RFID tags change, in response to the corrosive damaging the RFID tags. By quantifying the number of damaged RFID tags, a determination can be made as to the progress status of the catalytic process.

The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION OF THE PREFERRED EMBODIMENT

Figure 1:
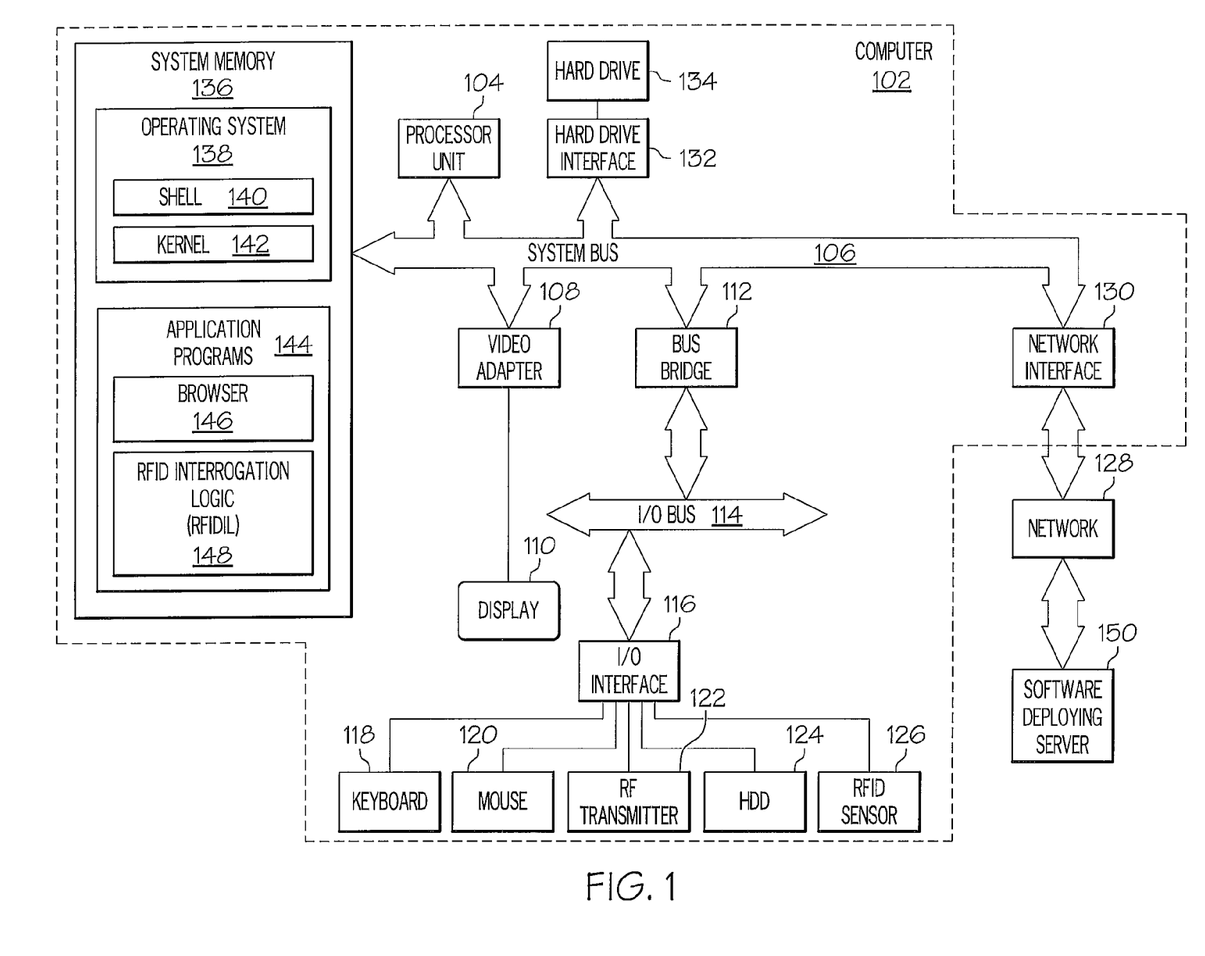
FIG. 1 depicts an exemplary computer which may be utilized by the present invention.

With reference now to the figures, and in particular to FIG. 1, there is depicted a block diagram of an exemplary computer 102, which the present invention may utilize. Note that some or all of the exemplary architecture shown for computer 102 may be utilized by software deploying server 150.

Computer 102 includes a processor unit 104, which may utilize one or more processors each having one or more processor cores, that is coupled to a system bus 106. A video adapter 108, which drives/supports a display 110, is also coupled to system bus 106. System bus 106 is coupled via a bus bridge 112 to an Input/Output (I/O) bus 114. An I/O interface 116 is coupled to I/O bus 114. I/O interface 116 affords communication with various I/O devices, including a keyboard 118, a mouse 120, a Radio Frequency (RF) transmitter 122, a Hard Disk Drive (HDD) 124, and a Radio Frequency Identification (RFID) sensor 126. It is recognized that RF transmitter 122 and RFID sensor 126 should be protected from one another, by distance or a shield (not shown), in order to enable proper functionality of the RFID sensor 126. The format of the ports connected to I/O interface 116 may be any known to those skilled in the art of computer architecture, including but not limited to Universal Serial Bus (USB) ports.

Computer 102 is able to communicate with a software deploying server 150 via a network 128 using a network interface 130, which is coupled to system bus 106. Network 128 may be an external network such as the Internet, or an internal network such as an Ethernet or a Virtual Private Network (VPN).

A hard drive interface 132 is also coupled to system bus 106. Hard drive interface 132 interfaces with a hard drive 134. In a preferred embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a World Wide Web (WWW) client (i.e., computer 102) to send and receive network messages to the Internet using HyperText Transfer Protocol (HTTP) messaging, thus enabling communication with software deploying server 150 and other described computer systems.

Application programs 144 in computer 102's system memory (as well as software deploying server 150's system memory) also include a RFID Interrogation Logic (RFIDIL) 148. RFIDIL 148 includes code for implementing the processes described below, and particularly as described in FIGS. 6-9. In one embodiment, computer 102 is able to download RFIDIL 148 from software deploying server 150, including in an on-demand basis. Note further that, in one embodiment of the present invention, software deploying server 150 performs all of the functions associated with the present invention (including execution of RFIDIL 148), thus freeing computer 102 from having to use its own internal computing resources to execute RFIDIL 148.

The hardware elements depicted in computer 102 are not intended to be exhaustive, but rather are representative to highlight essential components required by the present invention. For instance, computer 102 may include alternate memory storage devices such as magnetic cassettes, Digital Versatile Disks (DVDs), Bernoulli cartridges, and the like. These and other variations are intended to be within the spirit and scope of the present invention.

In an exemplary embodiment, the present invention utilizes Radio Frequency Identification (RFID) tags to track a progress of a catalyst-driven chemical process. As known to those skilled in the art, an RFID tag may be active (i.e., battery powered), semi-passive (i.e., powered by a battery and a capacitor that is charged by an RF interrogation signal), or purely passive (i.e., either have a capacitor that is charged by an RF interrogation signal or are geometrically shaped to reflect back specific portions of the RF interrogation signal). Passive RFID tags may contain an on-board Integrated Circuit (IC) chip, or they may be chipless.

Figure 2:
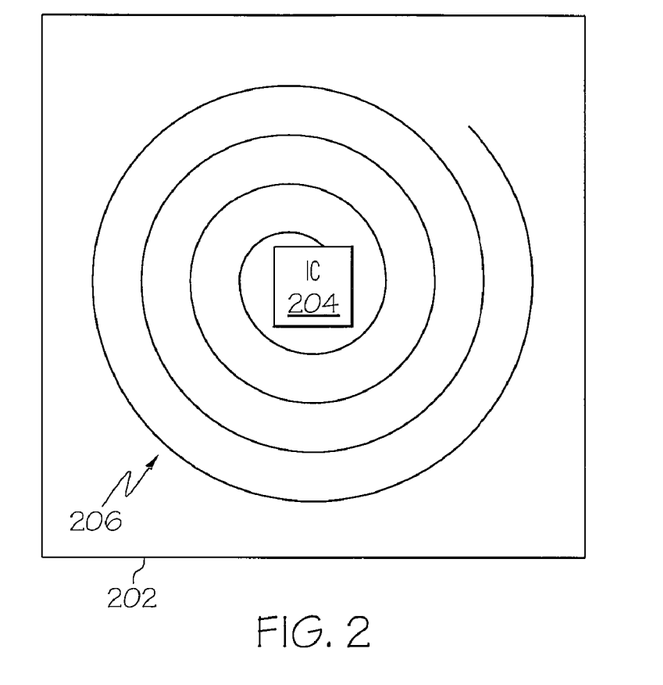
FIG. 2 illustrates an exemplary chip-enabled Radio Frequency Identification (RFID) tag.

Referring now to FIG. 2, an exemplary RFID tag 202 having an on-board IC chip is made up of two components: the IC chip 204 and a coupled antenna 206. The IC chip 204 stores and processes information, including Electronic Product Code (EPC) information that describes the RFID tag (e.g., gives the RFID's name, description of a coating on the RFID, including what corrosives will remove the coating and at what rate, how the corrosive removal temporally tracks with catalyst-driven processes, etc.). The IC chip 204 may contain a low-power source (e.g., a capacitor, not shown, that is charged by an interrogation signal received by the coupled antenna). Upon the capacitor being charged, the IC chip 204 then generates a radio signal, which includes the EPC information, to be broadcast by the coupled antenna 206.

Figure 3:
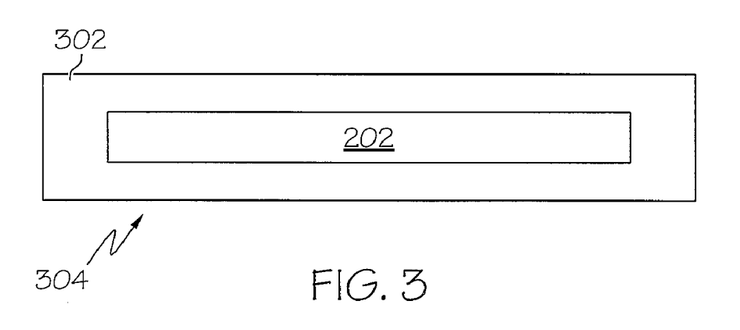
FIG. 3 depicts a corrosive-sensitive coating for the chip-enabled RFID tag shown in FIG. 2.

Referring now to FIG. 3, the RFID tag 202 shown in FIG. 2 is shown with a coating 302 to form a coated RFID tag 304. The coating 302 is engineered to corrode away at a specific rate when exposed to a particular corrosive. Thus, by adjusting the thickness of the coating 302, and by matching the corrosion properties of the coating with a catalytic process, a status of the catalytic process can be tracked. For example, first assume that the coating 302 has a composition and thinness such that a corrosive (e.g., a caustic, an acid, etc.) will eat through the coating 302, and thus reach and damage/alter/destroy the RFID tag 202, at a same rate that it takes a catalytic process to initialize (e.g., for a catalyst to become active). Thus, when the coated RFID tag 304 becomes inoperable (such that the digital signature signal is lost when interrogated by an RF interrogation signal), it can be assumed that the catalytic process has begun. Second, assume that the catalyst in the catalytic process has a limited lifetime, based on time, exposure to reactants, heat, and other variables, and that the coating 302 is of a greater thickness (or a different material) than that just described in the first scenario. Also assume that the greater thickness of the coating 302 corrodes at a same rate as a catalyst in the material becomes deactivated. Thus, in this second scenario, when the coating 302 is corroded away, the loss of a digital signature signal from the RFID tag 202 (having a different signature than that of the RFID tag 202 described in the first scenario) indicates that the catalyst has also become inactive, and thus no additional catalyst-driven processes will occur in the material.

Figure 4:
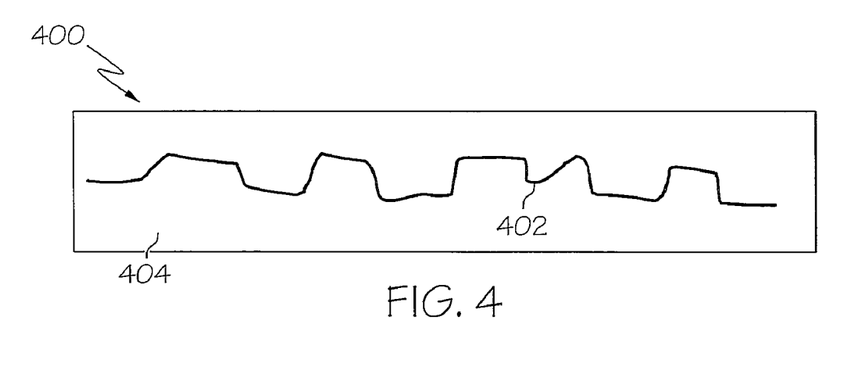
FIG. 4 illustrates an exemplary chipless RFID tag with a corrosive-sensitive coating.

As depicted in FIG. 4, the same principles described above for coated RFID tag 304 may also be applied to a coated chipless RFID tag 400. Coated chipless RFID tag 400 uses a chipless RFID tag 402 that is coated with a coating 404, which is similar to the coating 302 described above in FIG. 3. As the name implies, chipless RFID tag 402 does not have an IC chip, but is only an antenna that is shaped to reflect back a portion of an interrogation RF signal. That is, the chipless RFID tag 402 (also known as a Radio Frequency (RF) fiber) is physically shaped to reflect back select portions of a radio interrogation signal from an RF transmission source. Chipless RFID tag 402 typically has a much shorter range than an RFID chip that includes an on-board IC chip, such as RFID tag 202. Furthermore, the amount of information that chipless RFID tag 402 can store and return is much smaller than that of RFID tag 202 with its on-board IC chip.

Figure 5A:
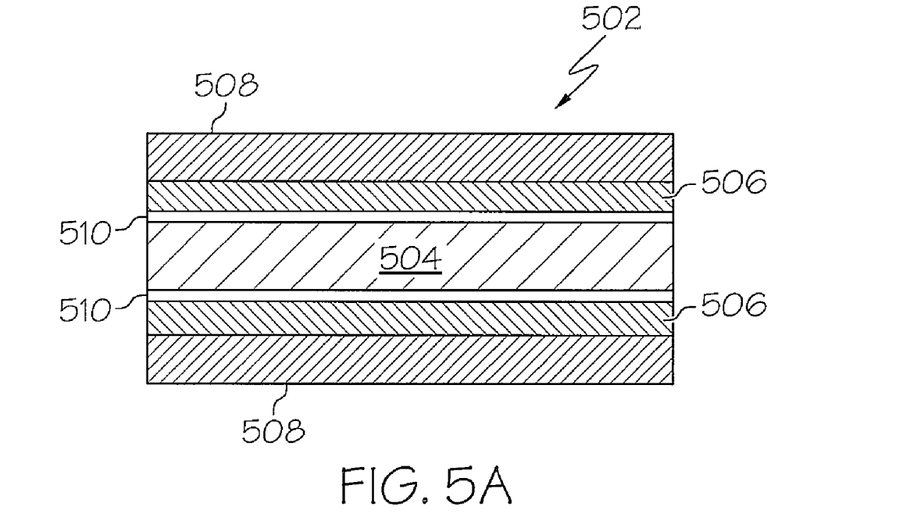
FIGS. 5a-b illustrate the coated RFID tag, shown in FIG. 3, with an additional slough-able Faraday shield.
Figure 5B:
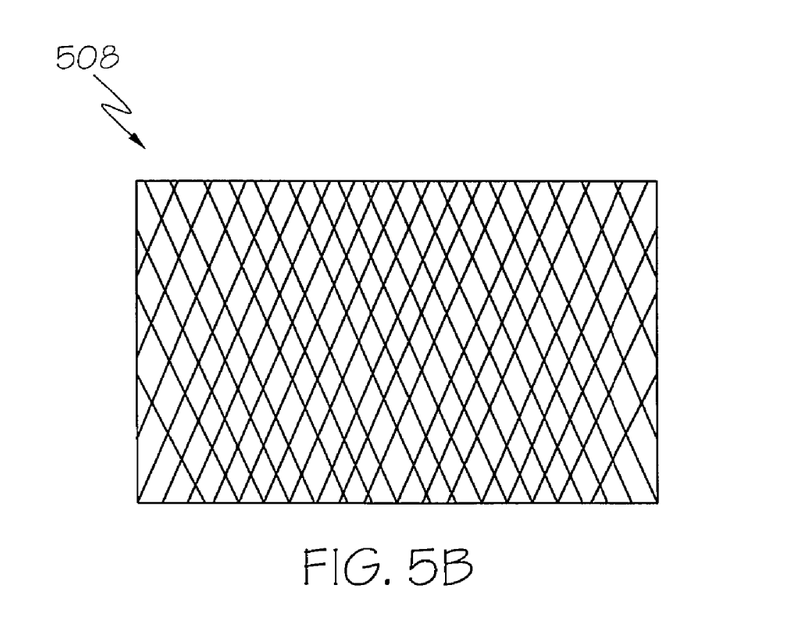

An RFID screened tag 502 depicted in FIGS. 5*a-b* illustrates an alternative RFID tag that may be used to determine the status of a catalyst-driven process. The coated RFID tag 304 and coated chipless RFID tag 400 described above work on the principal that an absence of a digital signature from the tag indicates a certain progress in the catalyst-driven process. The RFID coated tag 502, however, operates in an opposite manner, such that the presence of a digital signature, rather than the absence of a digital signature, provides an indication of the progress of the catalyst-driven process. As shown in a side cutaway view in FIG. 5*a*, RFID screened tag 502 initially has a RFID tag 504 (e.g., the RFID tag 202 or chipless RFID tag 402 described above) that is surrounded by a corrosive-sensitive coating 506, which binds a Faraday shield coating 508. Optionally, RFID screened tag 502 also may have a corrosive-resistant shield 510, which protects the RFID tag 504 from corrosives. Initially, the RFID tag 504 cannot be interrogated by an RF interrogation signal, since the Faraday shield coating 508 blocks such signals. However, when the corrosive-sensitive coating 506 is corroded away by a corrosive, the Faraday shield 508 sloughs off, allowing RF signals to reach the inner RFID tag 504.

Figure 6:
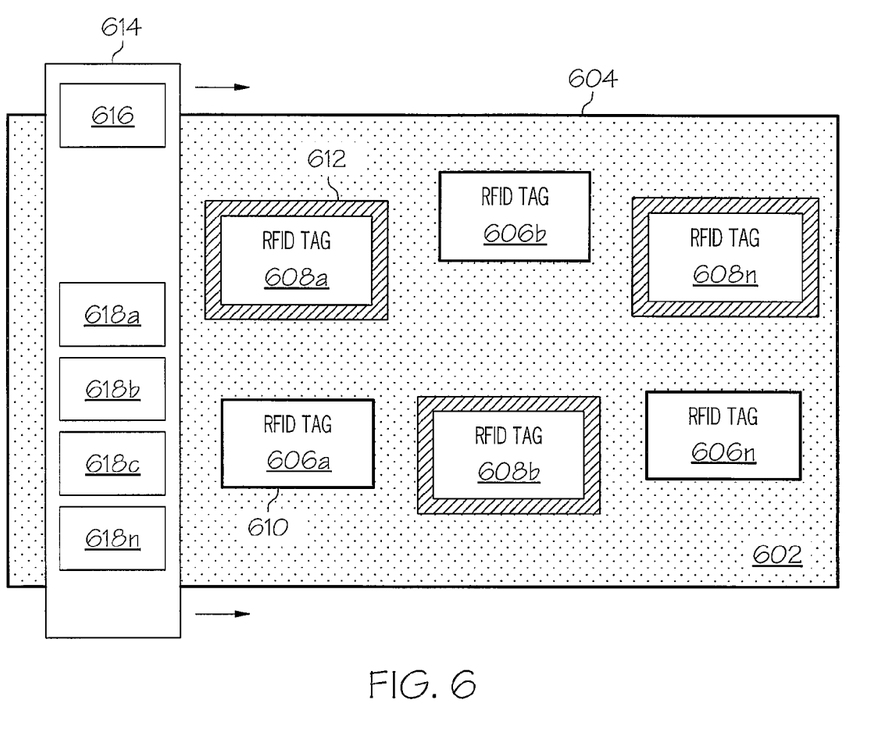
FIG. 6 illustrates a mixture that is laced with multiple RFID tags in an unbound colloidal manner.

With reference now to FIG. 6, an exemplary use of RFID tags to track a status (or progress) of a catalyst-driven process is depicted. Assume that mixture 602, contained in a container 604, includes reactants and a catalyst that experience a catalyst-driven process when allowed to interact. As depicted, the mixture 602 is laced with a first set of RFID tags 606*a*-n, where "n" is an integer, and a second set of RFID tags 608*a*-n. Each of the RFID tags 606*a*-n and/or 608*a*-n may be IC chip-enabled (e.g., RFID tag 202) or chipless (e.g., chipless RFID tag 402).

Note 1) that the first and second set of RFID tags (606*a*-n and 608*a*-n) have different coatings (respectively labeled as coatings 610 and coatings 612). Coatings 610 and 612 have different levels of resistance to a corrosive found in the mixture 602. This difference may be due to different thicknesses, or the coatings may be composed of different types of material. Assume, for exemplary purposes, that the coatings are composed of a same material, but that coatings 610 are thinner than coatings 612. Thus, RFID tags 606*a*-n will be exposed to the mixture 602 (and any catalyst, reactants and corrosives therein) before RFID tags 608*a*-n. It is this feature that will result in the first set of RFID tags 606*a*-n having their coatings 610 removed before the second set of RFID tags 608a-n have their coatings 612 removed.

Assume now that the thickness of coatings 610 is engineered to allow the coatings 610 to be corroded off (removed from) the RFID tags 606a-n at the same time that the catalyst in the material 602 becomes activated. Thus, when the RFID tags 606a-n (i.e., the inner RFID chips themselves) are exposed to corrosives (or other damaging substances in the mixture 602), they lose their ability to respond with an RFID signature when interrogated by an RF interrogation signal. (Alternatively, the RFID tags 606a-n gain the ability to respond to an RF interrogation signal, if they have a Faraday shield such as that shown in FIGS. 5a-b). By detecting a change in the presence of RFID signature signals from (preferably a pre-determined number or percentage of) the RFID tags 606a-n, a first conclusion is reached that the catalyst in the material 602 has become activated, and the catalyst-driven process in the mixture 602 has commenced. This detection may be performed by an RF interrogator 614, which includes an RF interrogation signal transmitter 616 (analogous to the RF transmitter 122 described in FIG. 1) and one or more RFID sensors 618a-n (each being analogous to the RFID sensor 126 described in FIG. 1). The RF interrogator 614 is coupled to logic (not shown, but analogous to computer 102 described in FIG. 1) for detecting and counting RFID signals.

Consider now the coatings 612, which have a thickness such that the coatings 612 are corroded away from (and off of) the RFID tags 608a-n at the same time that the catalyst in the material 604 becomes deactivated (inert), thus stopping the catalyst-driven process in the material 602. By detecting a change in the presence of RFID signature signals from the RFID tags 608a-n, a second conclusion is drawn that the catalyst has become inert, and that the catalyst-driven process in material 602 has ended. Again, these changes in the RFID signatures are detected by the RF interrogator 614, which may be drawn across a face of container 604. Note also that the first set of RFID tags 606a-n and the second set of RFID tags 608a-n are not adhered to the material 602, but rather are suspended within the bulk material 602 in a colloidal state.

The RFID tags 606a-n and 608a-n depicted in FIG. 6 are not shown to scale. That is, the RFID tags 606a-n and 608a-n are preferably small (i.e., less than 0.5 mm×0.5 mm), in order to allow them to flow freely and without clogging piping. In one embodiment, the RFID tags 606a-n and 608a-n remain uniformly mixed throughout the material 602. If the material 602 is a dry particulate matter (e.g., dry chemicals), then the RFID tags 606a-n and 608a-n will naturally remain in a dispersed orientation. However, if the material 602 is a liquid (e.g., an emulsion or liquid), then a buoyancy coating (e.g., as a physical feature of the coatings 610 and/or 612, or by another coating that is not depicted) around the RFID tags 606a-n and 608a-n may be needed to give the RFID tags a same specific gravity as the material 602.

Figure 7:
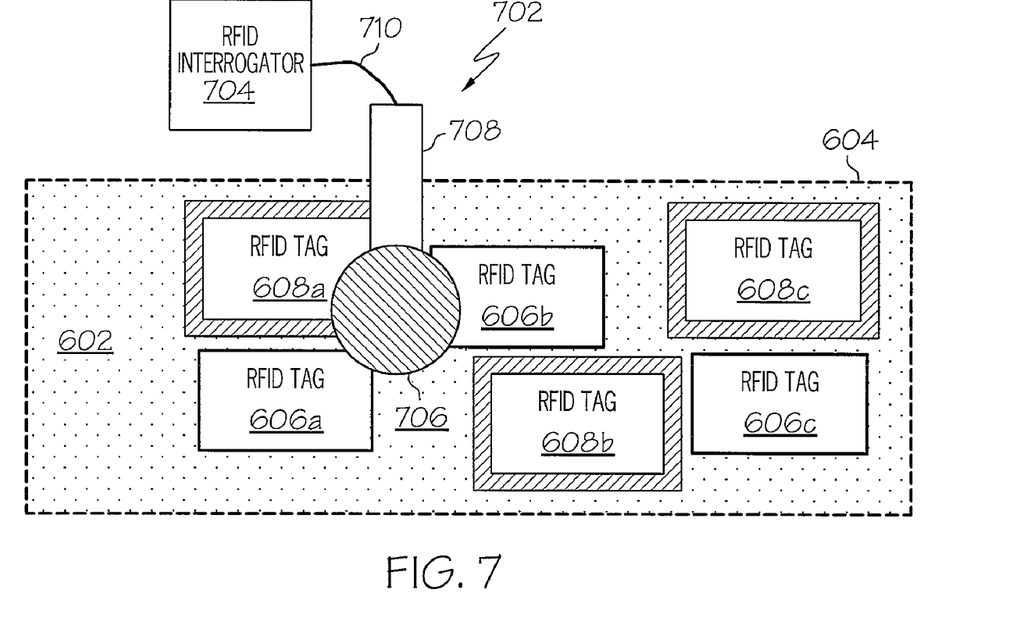
FIG. 7 depicts a mixture having RFID tags that are being monitored with an RFID probe.
Figure 8:
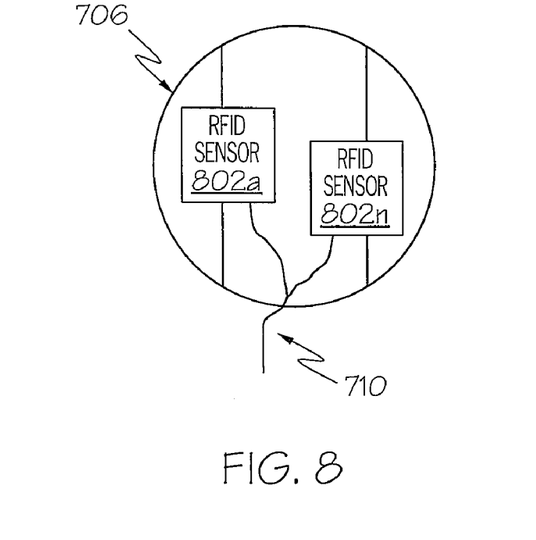
FIG. 8 illustrates additional detail of a RFID sensors in the RFID probe shown in FIG. 7.

Referring now to FIG. 7, note that an RFID detector wand 702, having an RFID interrogator 704 (e.g., a computer 102 depicted in FIG. 1) coupled to an RFID detector paddle 706, which is supported by a shaft 708 and electrically coupled to the RFID interrogator 704 via a cable 710. FIG. 8 provides additional detail of the inner structure of the RFID detector paddle 706, showing one or more RFID sensors 802a-n (analogous to RFID sensor 126 described in FIG. 1) mounted on a non-interfering grid. RFID detector wand 702 can be manually or robotically inserted into the mixture 602 to detect activity (or lack thereof) in the various RFID tags described and depicted. Note that paddle 706 is preferably thin (e.g., like a paddle head), in order to allow the RFID sensors 802a-n to be proximate to the RFID tags in the mixture 602.

RFID detector wand 702 utilizes an architecture that is substantially similar to computer 102 described in FIG. 1. That is, RFID detector wand 702 includes an RF transmitter 122 (e.g., within the shaft 708) and at least one RFID sensor 126 (within the RFID detector paddle 706), which interrogates the RFID tags 606a-n and 608a-n. This interrogation is accomplished by transmitting an RF interrogation signal from an RF transmitter (e.g., RF transmitter 122 shown in FIG. 1) in the shaft 708 to the RFID tags 606a-n and 608a-n, which then respond (to RFID sensor 126 shown in FIG. 1) with ID data for the RFID tags 606a-n and 608a-n.

Figure 9:
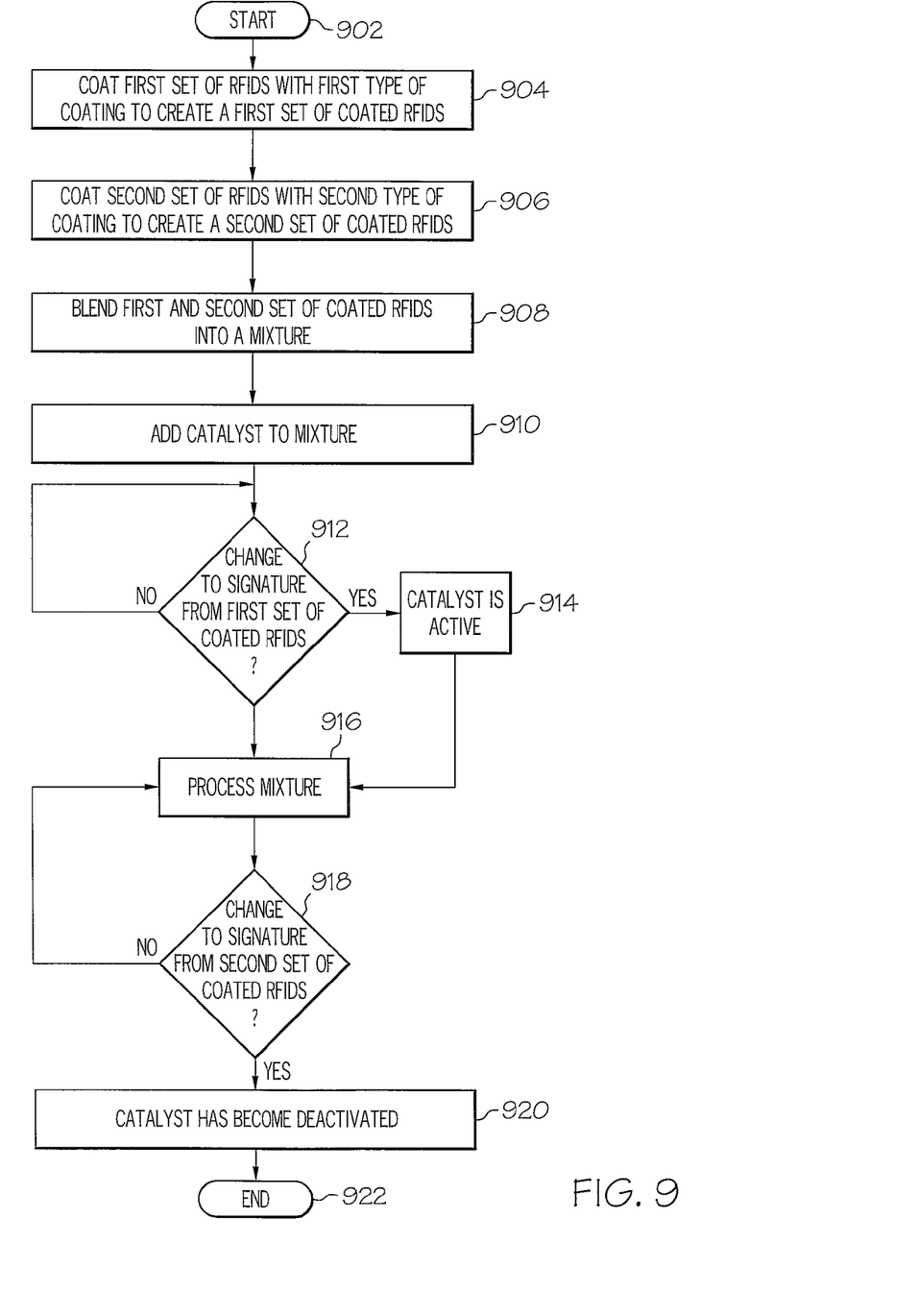
FIG. 9 is a high-level flow-chart of exemplary steps taken to tract a catalyst-driven chemical process using specially coated RFID tags.

With reference now to FIG. 9, a high-level flow-chart of exemplary steps taken to track a status of a catalyst-driven process in a mixture is presented. After initiator block 902, a first set of RFID tags is coated with a first type of coating (block 904). A second set of RFID tags is coated with a second type of coating (block 906). The differences in the coatings may simply be due to a different thickness of a same type of material, or the materials in the coatings may themselves be different. Both types of coatings, however, are susceptible to being stripped away from RFID tags at a time or event that corresponds to a catalyst-driven process. As described above, in one embodiment this means that thin coated RFID tags lose their coats at the same time that a catalyst becomes active, while the thick coated RFID tags lose their coats at the same time that the catalyst becomes deactivated. Note that "time" may actually mean a temporal event (i.e., the thin coats are removed in five minutes, which is the same amount of time that is takes to activate the catalyst), or "time" may mean a corresponding event (i.e., the thin coats are removed contemporaneously with the catalyst becoming activated, but this contemporaneousness is not time-dependent, but rather event-dependent). That is, in the second scenario ("event-dependent"), the removal of the thin coats does not merely act as a time-keeper, but rather describes a same progress state (e.g., in progress, complete) for stripping off the coating as the progress state (e.g., in progress, complete) of the catalyst activation. Thus, removal of the coatings on the RFID tags can either be a way to measure time (e.g., five minutes have passed since the catalyst was introduced into the material), or a way to measure an activity or condition (e.g., the catalyst is now activated).

Returning now to FIG. 9, the first and second set of RFID tags are blended into a mixture containing reactants (block 908), and a catalyst is added to the mixture (block 910). If the RFID signature from the first set of RFID tags changes (stops or starts, depending on the structure of the coating as described above), as queried in query block 912, then a conclusion is reached that the catalyst has become active (block 914), and the catalyst-driven processing of the material has begun (block 916). Subsequently, if the RFID signature from the second set of RFID tags changes, as queried in query block 918, then an assumption is made that the catalyst has become deactivated (block 920), and a conclusion is reached that the catalyst-driven process has terminated. The process ends at terminator block 922.

Note that while RFID tags 606a-n and 608a-n are depicted as RFID tags, it is understood that the concept of coating an electronic device with a corrosive-sensitive coating, in order to track a progress of a corresponding catalyst-driven process, may be applied to any electronic device whose functionality is altered if a protective corrosive-sensitive coating is removed.

It should be understood that at least some aspects of the present invention may alternatively be implemented in a computer-readable medium that contains a program product. Programs defining functions of the present invention can be delivered to a data storage system or a computer system via a variety of tangible signal-bearing media, which include, without limitation, non-writable storage media (e.g., CD-ROM), writable storage media (e.g., hard disk drive, read/write CD ROM, optical media), as well as non-tangible communication media, such as computer and telephone networks including Ethernet, the Internet, wireless networks, and like network systems. It should be understood, therefore, that such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

While the present invention has been particularly shown and described with reference to a preferred embodiment, it will be understood by those skilled in the art that various changes in form and detail may be made therein without departing from the spirit and scope of the invention. For example, while the present description has been directed to a preferred embodiment in which custom software applications are developed, the invention disclosed herein is equally applicable to the development and modification of application software. Furthermore, as used in the specification and the appended claims, the term "computer" or "system" or "computer system" or "computing device" includes any data processing system including, but not limited to, personal computers, servers, workstations, network computers, main frame computers, routers, switches, Personal Digital Assistants (PDA's), telephones, and any other system capable of processing, transmitting, receiving, capturing and/or storing data.

What is claimed is:

1. A method of tracking a status of a catalyst-driven process in a mixture, the method comprising:
    interrogating, with a Radio Frequency (RF) interrogation signal, a first set of Radio Frequency Identification (RFID) tags that is in a mixture, wherein each RFID tag in the first set of RFID tags is coated with a first coating that causes the RF interrogation signal to receive a first response from an interrogation of the first set of RFID tags, and wherein a corrosive in the mixture corrodes the first coating away at a rate such that the first coating is removed from at least one RFID tag, from the first set of RFID tags, at a same time that a catalyst in the mixture becomes activated; and
    determining that the catalyst in the mixture is actively processing the mixture when a different response is received from the interrogation of the first set of RFID tags, wherein the different response indicates that the first coating has been removed from a first pre-determined quantity of RFID tags from the first set of RFID tags.

2. The method of claim 1, wherein the first pre-determined quantity of RFID tags is determined to be lacking the first coating when a first digital signature, for the first pre-determined quantity of RFID tags, changes.

3. The method of claim 2, wherein the first digital signature is destroyed when the corrosive damages the first pre-determined quantity of RFID tags after the first coating is corroded off.

4. The method of claim 2, wherein the corrosive removes a substrate that secures a separate RF shield that surrounds each of the first pre-determined quantity of RFID tags, and wherein the first digital signature changes when the corrosive removes the substrate and RF shield to permit the first digital signature to be detected.

5. The method of claim 1, further comprising:
    interrogating a second set of RFID tags that is in the mixture, wherein each RFID tag in the second set of RFID tags is coated with a second coating, and wherein the second coating is more resistant to corrosion by the corrosive in the mixture than the first coating; and
    determining that the catalyst has been deactivated when the second coating has been removed from a second pre-determined quantity of RFID tags from the second set of RFID tags.

6. The method of claim 5, wherein the second pre-determined quantity of RFID tags is determined to be lacking the second coating when a second digital signature, for the second pre-determined quantity of RFID tags, changes.

7. The method of claim 6, wherein the second digital signature is destroyed when the corrosive damages the first pre-determined quantity of RFID tags when the second coating is removed by corrosion caused by the corrosive.

8. The method of claim 6, wherein the corrosive removes a substrate that secures an RF shield around each of the second pre-determined quantity of RFID tags, and wherein the second digital signature changes when the corrosive removes the substrate and RF shield to permit the second digital signature to be detected.

9. The method of claim 5, further comprising:
    in response to determining that the catalyst has expired, discarding the material.

10. The method of claim 5, wherein corroding the second coating off the second pre-determined quantity of first RFID tags indicates that a second pre-determined period of time has elapsed.

11. The method of claim 1, wherein the corrosive is the catalyst.

12. The method of claim 1, wherein the first coating and second coating are composed of a same material, and wherein the first coating is thinner than the second coating.

13. The method of claim 1, wherein the first coating and second coating are composed of different materials that have different corrosion-resistant qualities.

14. The method of claim 1, wherein the corrosive is a substrate in the material, wherein the substrate reacts with the catalyst in a chemical reaction.

15. A method of enabling a tracking of a status of a catalyst in a mixture, the method comprising:
    coating at least one Radio Frequency Identification (RFID) tag in a first set of RFID tags with a first coating, wherein a corrosive in a mixture corrodes the first coating away at a rate such that the first coating is removed from at least one RFID tag, from the first set of RFID tags, at a same time that a catalyst in the mixture becomes activated, wherein a change in a first RF response signal from the at least one RFID tag in the first set of RFID tags indicates that the corrosive has corroded the first coating and has altered the at least one RFID tag in the first set of RFID tags, and wherein the change in the first RF response signal also indicates that a first period of time, corresponding to a time for the first coating to be removed by the corrosive, has elapsed to allow the catalyst enough time to become active in the mixture.

16. The method of claim 15, further comprising:
    coating at least one RFID tag in a second set of RFID tags with a second coating, wherein the second coating is more resistant to corrosion by the corrosive than the first coating, and wherein a change in a second RF response signal from the at least one RFID tag in the second set of RFID tags indicates that a second period of time has elapsed, wherein the catalyst becomes deactivated after the second period of time.

17. The method of claim 15, wherein the corrosive and the catalyst are a same material.

18. The method of claim 15, wherein the mixture is laced with the first set of RFID tags and the second set of RFID tags in an unbound colloidal state.

19. An electronic signature device for determining if a catalyst has become activated after being introduced into a mixture for a pre-determined period of time, the electronic signature device comprising:
 a signature storage structure for storing a digital signature;
 a transmitter for transmitting the digital signature in response to receipt of an electronic interrogation signal; and
 a time-sensitive coating that is designed to be corrosively removed from the electronic signature device when exposed to a specific corrosive for the pre-determined period of time, wherein in response to the time-sensitive coating being present around the electronic signature device, the electronic signature device provides a first response to receipt of the electronic interrogation signal, and in response to the time-sensitive coating not being present around the electronic signature device, the electronic signature device provides a different response to receipt of the electronic interrogation signal, wherein a change to the digital signature indicates that the electronic signature device has been damaged by the specific corrosive in a mixture, and wherein a change to the digital signature indicates that the pre-determined period of time has elapsed and that the catalyst has become activated.

20. The electronic signature device of claim 19, wherein the electronic signature device is a Radio Frequency Identification (RFID) tag.

* * * * *